July 5, 1932. H. F. KNEPLEY 1,865,862
NEVERSLIP HORSESHOE HOLDER
Filed Jan. 23, 1932
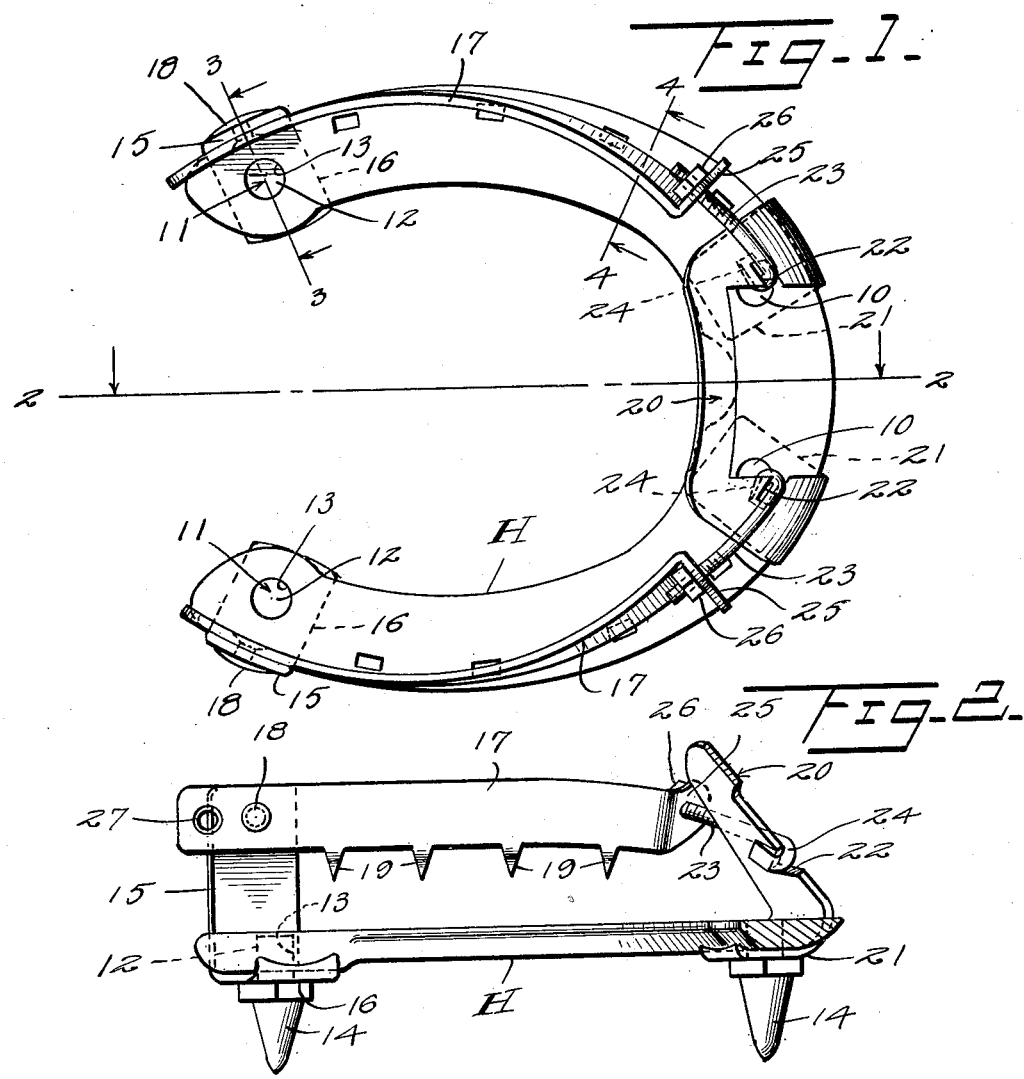
Inventor
H. F. Knepley
By Watson E. Coleman
Attorney Patented July 5, 1932

1,865,862

UNITED STATES PATENT OFFICE

HARRY F. KNEPLEY, OF NAPOLEON, OHIO

NEVERSLIP HORSESHOE HOLDER

Application filed January 23, 1932. Serial No. 588,420.

This invention relates to horseshoes and more particularly to a non-slippable shoe.

An object of this invention is to provide a shoe of this kind which may be removably mounted on the hoof of a horse so as to prevent the horse from slipping on icy roads or the like.

Another object of this invention is to provide a removable shoe of this kind which is so constructed that it will not injure the hoof of the horse and at the same time which embodies means whereby it can be adjusted to fit various sizes of hoofs within a predetermined range.

A further object of this invention is to provide a shoe of this kind with calks which may be readily replaced.

The above and various other objects and advantages of this invention will in part be described in and in part be understood from the following detailed description of the present preferred embodiment, the same being illustrated in the accompanying drawing, wherein:—

Figure 1 is a detail top plan view of a shoe constructed according to the preferred embodiment of this invention;

Figure 2 is a sectional view taken on the line 2—2 of Figure 1;

Figure 3 is a sectional view taken on the line 3—3 of Figure 1; and

Figure 4 is a sectional view taken on the line 4—4 of Figure 1.

Referring to the drawing wherein like numerals of reference designate corresponding parts throughout the several views, the letter H designates generally a conventional U-shaped horseshoe which is provided with a pair of forward or front calks 10 and with rear calks 11 at the rear or open ends of the shoe H. These calks 10 and 11 are provided with a threaded stem 12 engaging in a threaded opening 13 provided in the horseshoe H and the calk proper is of round and tapering construction, the taper converging downwardly into a relatively sharp point, as at 14, so as to project into ice or other relatively hard material and thereby prevent slipping of the shoe.

The shoe H is provided at the rear end thereof with an upstanding plate 15 which has an inturned or horizontal extension 16 formed therewith, this extension 16 being provided with a suitable aperture and engages about the stem or stud 12 of the rear calks 11 and is interposed between the base of the calk and the lower surface of the shoe H.

An elongated arcuate bar 17 is pivoted, as at 18, to the upper end of the plate or bracket 15 and extends forward toward the front calks 10. This bar 17 at the lower edge thereof has a plurality of depending and inturned prongs or tangs 19 which are adapted to project into the hoof of the horse above the bottom thereof. Preferably, this securing bar 17 is formed so as to snugly engage the surface of the hoof above the bottom, and when the tangs 19 project into the hoof, the shoe H will be prevented from slipping off of the hoof.

The forward end of the shoe H is provided with an upstanding substantially U-shaped member, generally designated as 20, which has inturned lower end portions 21 engaging beneath the forward end of the shoe and these extensions 21 are interposed between the calks 10 and the lower surface of the shoe H. The U-shaped member 20 is formed on an upward and rearward inclination so as to conform generally to the angle between the bottom and the front end of the hoof. This U-shaped member 20 is also curved so as to engage about the curvature at the front of the hoof.

The parallel legs of this U-shaped member 20 are each provided on the inner edge thereof with notches 22 which are disposed on an upward angle and a tightening member 23 which is provided with a hook-shaped forward end portion 24 which engages in the notch 22. The opposite end of the tightening member 23 extends through an outstanding lug 25 carried by the forward end of the securing bar 17 and a nut 26 bears against one face of this lug 25 and acts to securely tighten the bar 17 about the surface of the hoof.

In practice, there are two of these bars 17, one on each side of the shoe H so that each side of the shoe may be securely tightened about the hoof. This bar 17 is provided at the rear end thereof with a plurality of apertures 27 and the pivot 18 may be engaged in a selected aperture so as to either lengthen or shorten this bar, thereby permitting the mounting of the shoe on hoofs of varying sizes.

In the use of this improved shoe construction, the conventional shoe worn by the horse may be removed or in the event the calks on the shoe have been worn down, the shoe H may be engaged with the bottom of the shoe fastened on the hoof by nails or the like with the U-shaped member 20 engaging the front of the hoof. The pivot 18 may be engaged in the selected aperture 27 of the bar 17 and after the looped end portion 24 of the tightening member 23 has been positioned in the notch 22, the threaded end of this tightening member may be extended through the lug 25 and the nut 26 tightened so as to project the tangs 19 into the side of the hoof. As these tangs are disposed on a downward and inward angle, the shoe H will be prevented from dropping off of the hoof. Due to the removable mounting of the calks 10 and 11, when these calks have been worn down, they may be readily replaced by new calks which can be threaded into the desired threaded openings provided in the shoe H.

It is, of course, understood that various changes and modifications may be made in the details of construction and design of the above specifically described embodiment of this invention without departing from the spirit thereof, such changes and modifications being restricted only by the scope of the following claims.

What is claimed is:—

1. A horseshoe as set forth comprising a U-shaped shoe, threaded calks secured to the shoe, a bracket secured to each of the parallel legs of the shoe adjacent the rear end thereof, said bracket having an inturned lower end portion interposed between the calk and the lower surface of the shoe, a securing bar having a plurality of apertures adjacent the rear end thereof, a pivot engaging the bracket in a selected aperture in the bar, said bar having inwardly inclined tangs to engage the outer inclined surface of a hoof above the bottom thereof, an outstanding lug formed with the bar, an upstanding member secured to the forward end of the shoe, and a bolt engaging said upstanding member and said lug to tighten the securing member in adjusted position on the outer surface of the hoof.

2. A horseshoe as set forth comprising a U-shaped shoe, calks carried by the shoe, a bracket secured to each of the parallel legs of the shoe adjacent the rear end thereof, a securing bar having a plurality of apertures adjacent the rear end thereof, a pivot engaging the bracket in a selected aperture in the bar, tangs formed with the bar and inclined inwardly to engage the outer surface of a hoof above the bottom thereof, an outstanding lug formed with the free end of the bar, an upstanding member secured to the forward end of the shoe, said upstanding member having a pair of notches, and a bolt carried by the lug, said bolt having a hook-shaped end portion engaging a notch in the upstanding member whereby to releasably secure the bar to the upstanding member.

In testimony whereof I hereunto affix my signature.

HARRY F. KNEPLEY.